(12) United States Patent
Iwazawa et al.

(10) Patent No.: US 7,327,643 B2
(45) Date of Patent: Feb. 5, 2008

(54) RADIAL TILT COMPENSATING OPTICAL DISK APPARATUS USING TRACKING CONTROL LOOP GAIN

(75) Inventors: Naotoshi Iwazawa, Tokyo (JP); Yutaka Yamanaka, Tokyo (JP); Ryuichi Katayama, Tokyo (JP); Masahumi Miura, Tokyo (JP); Motoaki Shimizu, Tokyo (JP)

(73) Assignee: NEC Corporation, Tokyo (JP)

( * ) Notice: Subject to any disclaimer, the term of this patent is extended or adjusted under 35 U.S.C. 154(b) by 707 days.

(21) Appl. No.: 10/355,275

(22) Filed: Jan. 31, 2003

(65) Prior Publication Data

US 2003/0147315 A1   Aug. 7, 2003

(30) Foreign Application Priority Data

Feb. 4, 2002   (JP)   ............................. 2002-026689

(51) Int. Cl.
*G11B 7/09*   (2006.01)
(52) U.S. Cl. .................................. 369/44.32; 369/53.19
(58) Field of Classification Search ...................... None
See application file for complete search history.

(56) References Cited

U.S. PATENT DOCUMENTS

| | | | | |
|---|---|---|---|---|
| 5,559,771 A | * | 9/1996 | Kim ......................... | 369/44.35 |
| 5,602,808 A | * | 2/1997 | Futagawa et al. ......... | 369/44.14 |
| 5,663,942 A | * | 9/1997 | Ishibashi et al. .......... | 369/53.34 |
| 5,751,675 A | * | 5/1998 | Tsutsui et al. ............ | 369/44.27 |
| 6,240,054 B1 | * | 5/2001 | Takeya et al. ............ | 369/44.29 |
| 6,434,096 B1 | * | 8/2002 | Akagi et al. .............. | 369/44.32 |
| 6,438,076 B1 | * | 8/2002 | Kasahara et al. ......... | 369/44.14 |
| 6,496,452 B2 | * | 12/2002 | Stallinga et al. .......... | 369/44.23 |
| 6,510,112 B1 | * | 1/2003 | Sakamoto et al. ........ | 369/44.35 |
| 6,643,230 B2 | * | 11/2003 | Furukawa ................. | 369/44.23 |
| 7,038,995 B2 | * | 5/2006 | Kitamura et al. ......... | 369/112.24 |
| 2002/0001262 A1 | * | 1/2002 | Iwazawa et al. .......... | 369/44.36 |

FOREIGN PATENT DOCUMENTS

| | | |
|---|---|---|
| JP | H05-290398 A | 11/1993 |
| JP | H08-022625 A | 1/1996 |
| JP | 9-7207 A | 1/1997 |
| JP | 10-222860 A | 8/1998 |
| JP | H10-222854 A | 8/1998 |

(Continued)

OTHER PUBLICATIONS

Translation of JP 08-022625 provided by the Japanese Patent Office website.*

(Continued)

*Primary Examiner*—Andrea Wellington
*Assistant Examiner*—Michael V Battaglia
(74) *Attorney, Agent, or Firm*—Sughrue Mion, PLLC

(57) ABSTRACT

In an optical disk apparatus for focusing a light beam on a track of an optical disk by using a tracking control loop to perform at least one of recording and reproducing operations upon the optical disk, a loop level calculating unit calculates loop levels of the tracking control loop. A control unit calculates a loop gain of the tracking control loop in accordance with the loop levels of the tracking control loop and compensates for a radial tilt of the optical disk in accordance with the calculated loop gain of the tracking control loop.

17 Claims, 17 Drawing Sheets

FOREIGN PATENT DOCUMENTS

| | | |
|---|---|---|
| JP | H10-340462 A | 12/1998 |
| JP | 2000-57607 A | 2/2000 |
| JP | 2000-090462 A | 3/2000 |
| JP | 2000-195080 A | 7/2000 |
| JP | 3114661 B2 | 9/2000 |
| JP | 2000-298861 A | 10/2000 |
| JP | 2000-311370 A | 11/2000 |
| JP | 2000-348362 A | 12/2000 |
| JP | 2001-195762 A | 7/2001 |

OTHER PUBLICATIONS

H. Yamaguchi et al., "4.7 GB DVD-RAM Drive", Matsushita Technical Journal, vol. 45, No. 6, (Dec. 1999), pp. 67-73 with Abstract.

S. Ohtaki et al., "The Application of a Liquid Crystal Panel for the 15 Gbyte Optical Disk Systems", Jpn. J. Appl. Phys., vol. 38, Part 1, No. 3B, (Mar. 1999), pp. 1744-1749.

* cited by examiner

Fig. 5

| i | $I_{ri}$ |
|---|---|
| 0 | $I_{r0}$ |
| 1 | $I_{r1}$ |
| 2 | $I_{r2}$ |
| ⋮ | ⋮ |
| N | $I_{rN}$ |

RADIAL TILT COMPENSATING OPTICAL DISK APPARATUS USING TRACKING CONTROL LOOP GAIN

BACKGROUND OF THE INVENTION

1. Field of the Invention

The present invention relates to an optical disk apparatus, and more particularly, to the improvement of compensation of a radial tilt of an optical disk.

2. Description of the Related Art

In an optical disk apparatus, when an optical disk is inclined in the radial direction with respect to an objective lens of an optical head, the configuration of focused spots on the optical disk fluctuates due to the coma aberration arising from the inclination of the optical disk in the radial direction thereof which is called a radial tilt, so that the read/write characteristics fluctuate. Therefore, it is required to detect and compensate for the radial tilt of the optical disk.

In a first prior art optical disk apparatus (see: JP-A-11-039683 and JP-A-2001-195762), a tilt sensor is provided within an optical head to detect a radial tilt of an optical disk, and an actuator for tilting an objective lens or the optical head in the radial direction of the optical disk in accordance with the output signal of the tilt sensor. As a result, the radial tilt detected by the tilt sensor is brought close to zero.

In the above-described first prior art optical disk apparatus, however, since the tilt sensor is large in scale, it is impossible to decrease the size of the optical head including the tilt sensor. If the tilt sensor is forcibly decreased in size, the sensitivity of the tilt sensor deteriorates.

In a second prior art optical disk apparatus (see: JP-A-9-007207 and JP-A-2000-057606), the amplitude of a tracking error-signal, the amplitude of an radio frequency (RF) signal or a jitter of a digitalized signal of the RF signal is calculated, so that the radial tilt of an optical head is compensated for in accordance with a relationship between the radial tilt of an optical disk and the above-calculated value.

In the above-described second prior art optical disk apparatus, however, since there are a lot of disturbances other than the radial tilt component, a high accuracy of compensation of the radial tilt cannot be expected.

In a third prior art optical disk apparatus (see: JP-A-10-222860 and JP-A-2000-195080), at least one tilt sensor is provided outside the optical head to estimate a radial tilt of an optical disk.

In the above-described third prior art optical disk apparatus, although the problem of the first prior art optical disk apparatus is dissolved, the estimated value of the radial tilt is not accurate, so that a high accuracy of compensation of the radial tilt cannot be expected.

In a fourth prior art optical disk apparatus (see: JP-A-2000-348362), a focus search is carried out to detect periods at inner and outer peripheral sides of an optical disk corresponding to the amount of a radial tilt, and a difference between the periods is calculated to estimate the amount and direction of the radial tilt.

In the above-described fourth prior art optical disk apparatus, however, since the above-mentioned difference is affected by the attitude of the optical disk, and there is a rolling per one revolution of the optical disk, a high accuracy of compensation of the radial tilt cannot be expected.

In a fifth optical disk apparatus (see: H. Yamaguchi et al., "4.7 GB DVD-RAM Drive", Matsushita Technical Journal Vol. 45, No. 6, pp. 67-73, Dec. 1999), an offset value of a tracking error signal is detected as a radial tilt signal by centering a focused spot at a track using complementary allocated pit address (CAPA) headers.

The above-described fifth prior art optical disk apparatus, however, cannot be applied to optical disks having formats other than the CAPA headers.

SUMMARY OF THE INVENTION

It is an object of the present invention to provide an optical disk apparatus capable of accurately compensating for a radial tilt without a tilt sensor.

Another object is to provide a method for accurately compensating for a radial tilt of an optical disk apparatus.

According to the present invention, in an optical disk apparatus for focusing a light beam on a track of an optical disk by using a tracking control loop to perform at least one of recording and reproducing operations upon the optical disk, a loop level calculating unit calculates loop levels of the tracking control loop. A control unit calculates a loop gain of the tracking control loop in accordance with the loop levels of the tracking control loop and compensates for a radial tilt of the optical disk in accordance with the calculated loop gain of the tracking control loop.

BRIEF DESCRIPTION OF THE DRAWINGS

The present invention will be more clearly understood from the description set forth below, with reference to the accompanying drawings, wherein:

FIG. 5 is a table stored in the memory of the system control unit of FIG. 1;

DESCRIPTION OF THE PREFERRED EMBODIMENTS

Figure 1:
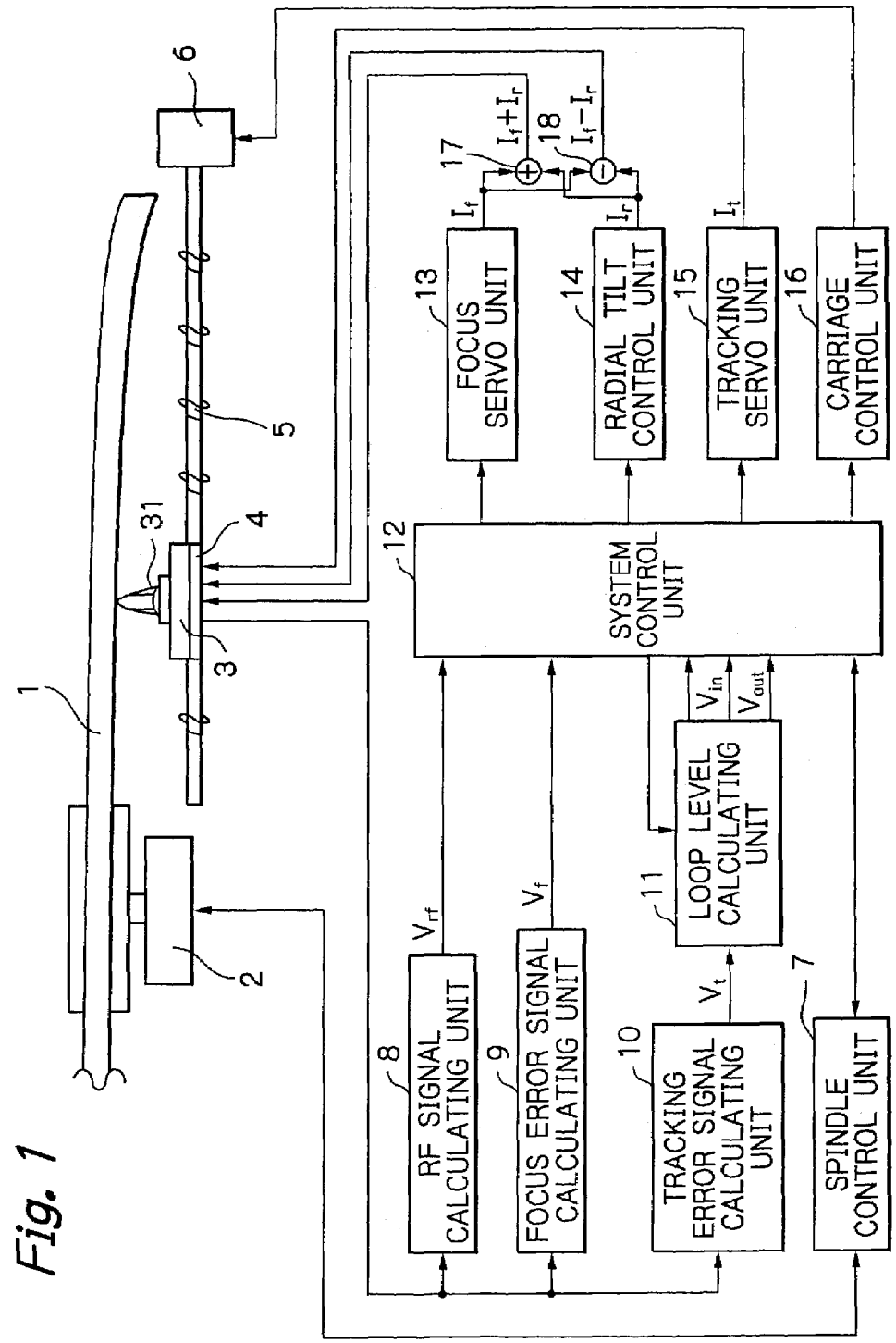
FIG. 1 is a diagram illustrating a first embodiment of the optical disk apparatus according to the present invention.

In FIG. 1, which illustrates a first embodiment of the optical disk apparatus according to the present invention, when an optical disk 1 is rotated by a spindle motor 2 at a predetermined speed, an optical head 3 performs a read/ write operation upon the optical disk 1. The optical head 3 is mounted on a head carriage 4 which can be moved along the radial direction of the optical disk 1 by a lead screw 5 driven by a carriage motor 6.

The optical head 3 includes an objective lens 31 for generating a light beam for the optical disk 1 and receiving a reflected light beam therefrom.

The spindle motor 2 is controlled by a spindle control unit 7.

Disk signals are supplied from the optical head 3 to an RF signal calculating unit 8, a focus error signal calculating unit 9 and a tracking error signal calculating unit 10. The RF signal calculating unit 8 calculates an RF signal $V_{rf}$. The focus error signal calculating unit 9 calculates a focus error signal $V_f$ by a known astigmatism method. The tracking error signal calculating unit 10 calculates a tracking error signal $V_t$ by a known push-pull method and transmits it to a loop level calculating unit 11.

The spindle control unit 7, the RF signal calculating unit 8, the focus error signal calculating unit 9 and the tracking error signal calculating unit 10 (the loop level calculating unit 11) are connected to a system control unit 12 which is constructed by a central processing unit (CPU), memories and the like.

The system control unit 12 also controls a focus servo unit 13 for driving the objective lens 31 along the focus direction of the optical disk 1 in accordance with the focus error signal $V_f$, a radial tilt control unit 14 for driving the objective lens 31 along the radial direction of the optical disk 1, and a tracking servo unit 15 for driving the objective lens 31 along the radial direction of the optical disk 1 in accordance with the tracking error signal $V_t$ to track the focused spot on a track. In this case, the system control unit 12 controls a carriage control unit 16 in accordance with the tracking error signal $V_t$, so that the carriage motor 6 is driven to move the optical head 3 along the radial direction of the optical disk 1.

Figure 2:
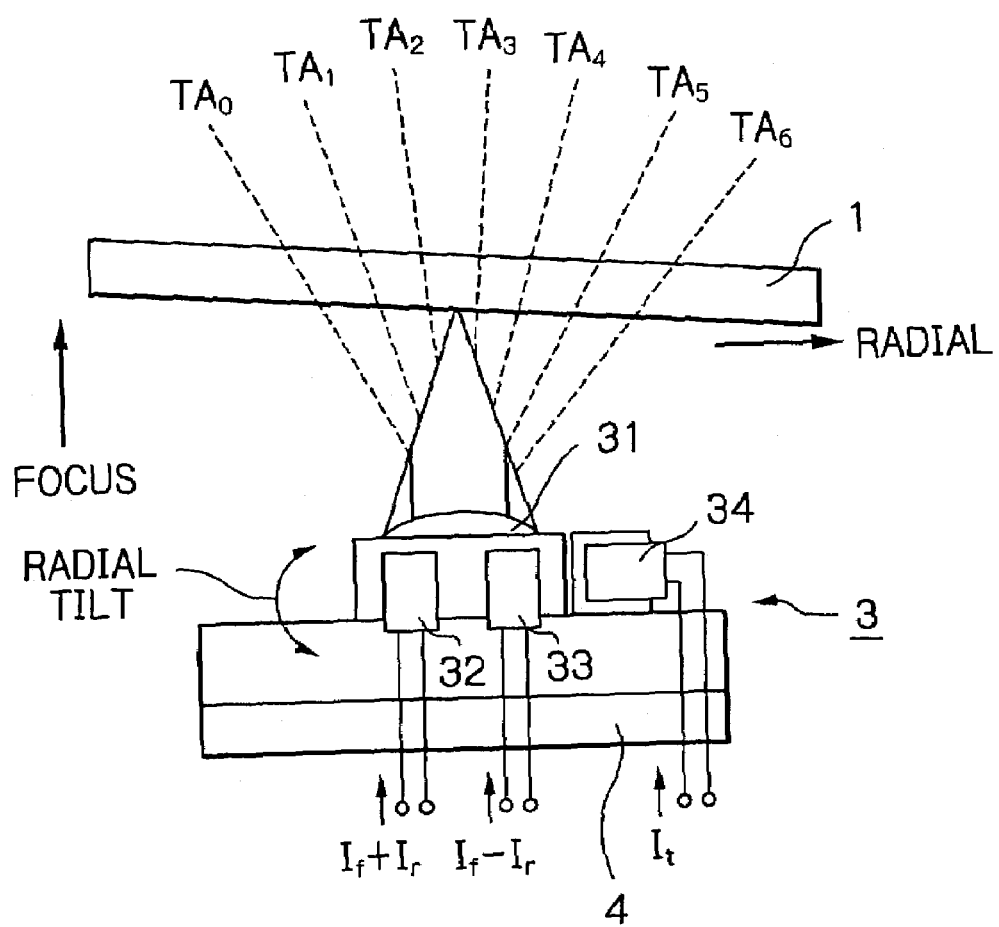
FIG. 2 is a detailed diagram of the optical head of FIG. 1.

A driving current $I_f$ generated from the focus servo unit 13 and a driving current $I_r$ generated from the radial tilt control unit 14 are added by an adder 17 which supplies a driving current $I_f+I_r$ to a focus winding 32 provided in the optical head 3 as illustrated in FIG. 2. Also, a difference between the driving current $I_f$ generated from the focus servo unit 13 and the driving current $I_r$ generated from the radial tilt control unit 14 is calculated by a subtracter 18 which supplies a driving current $I_f-I_r$ to a focus winding 33 provided in the optical head 3 as illustrated in FIG. 2. Further, a driving current $I_t$ generated from the tracking servo unit 15 is supplied to a tracking winding 34 in the optical head 3 as illustrated in FIG. 2.

As illustrated in FIG. 2, if the driving currents $I_f$ having the same phase are supplied to the focus windings 32 and 33, the objective lens 31 is moved along the focus direction. Also, if the driving currents $I_r$ having the opposite phases are supplied to the focus windings 32 and 33, the objective lens 31 is moved along the radial tilt direction.

Figure 3:
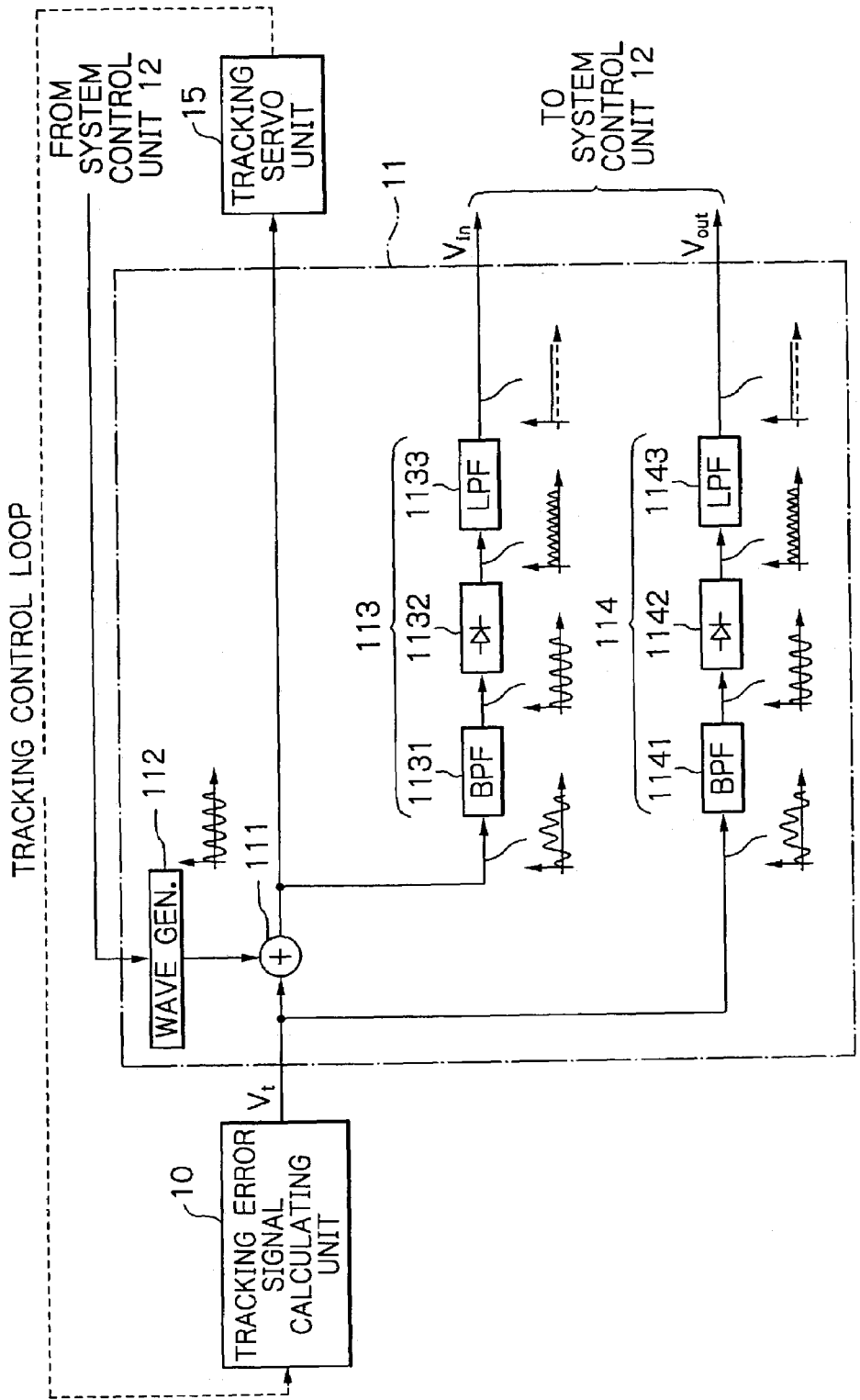
FIG. 3 is a detailed block diagram of the loop level calculating unit of FIG. 1.

In FIG. 3, which is a detailed block circuit diagram of the loop level calculating unit 11 of FIG. 1, the loop level calculating unit 11 is constructed by an adder 111 inserted between the tracking error signal calculating unit 10 and the tracking servo unit 15 via the system control unit 12, so that a tracking control loop is formed. In order to obtain a loop gain of the tracking control loop, while the tracking servo unit 15 is being operated so that a focused spot follows a track, a periodic wave signal such as a sinusoidal wave signal having a frequency of 2 to 2.5 kHz is generated by a sinusoidal wave generator 112 and is inserted via the adder 111 into the tracking control loop. The input level $V_{in}$ of the periodic wave signal to the tracking control loop is detected by a level detection unit 113 formed by a bandpass filter 1131, a full-wave rectifier 1132 and a lowpass filter 1133. On the other hand, the output level $V_{out}$ of the periodic wave signal from the tracking control loop is detected by a level detection unit 114 formed by a bandpass filter 1141, a full-wave rectifier 1142 and a lowpass filter 1143. In this case, the bandpass filters 1131 and 1141 only pass the frequency component of the periodic wave signal of the sinusoidal wave generator 112 therethrough, so that the frequency component of fluctuation of the tracking error signal is excluded by the bandpass filters 1131 and 1141.

Note that a loop gain G denoted by a ratio of the output level $V_{out}$ to the input level $V_{in}$ is calculated by the system control unit 12 ($G = V_{out}/V_{in}$).

When the loop gain G is maximum, the read/write characteristics are optimal. Therefore, when the radial tilt control unit 14 generates an optimal driving current $I_r$(LPOPT) for the maximal loop gain G, the read/write characteristics are optimal.

Figure 4:
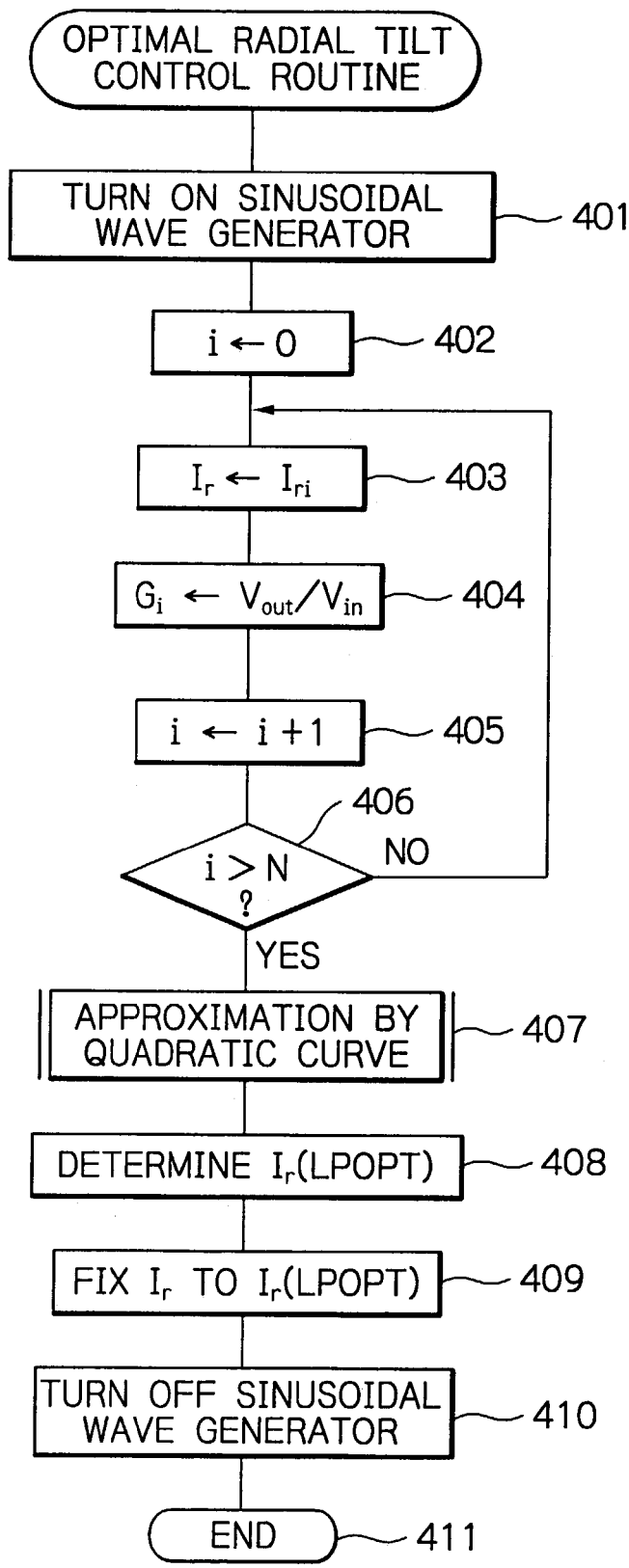
FIG. 4 is a flowchart for explaining a first operation of the system control unit of FIG. 1.

A first operation of the system control unit 12 for determining the optimal driving current $I_r$(LPOPT) will be explained next with reference to FIG. 4. The flowchart of FIG. 4 is carried out every time the optical head 3 is placed in a new track of the optical disk 1.

First, at step 401, the sinusoidal wave generator 112 is turned ON.

Next, at step 402, a value i is initialized, i.e., i=0.

Next, at step 403, a driving current $I_r$ of the radial tilt control unit 15 is set by $$I_r \leftarrow I_{ri}$$

Figure 5:
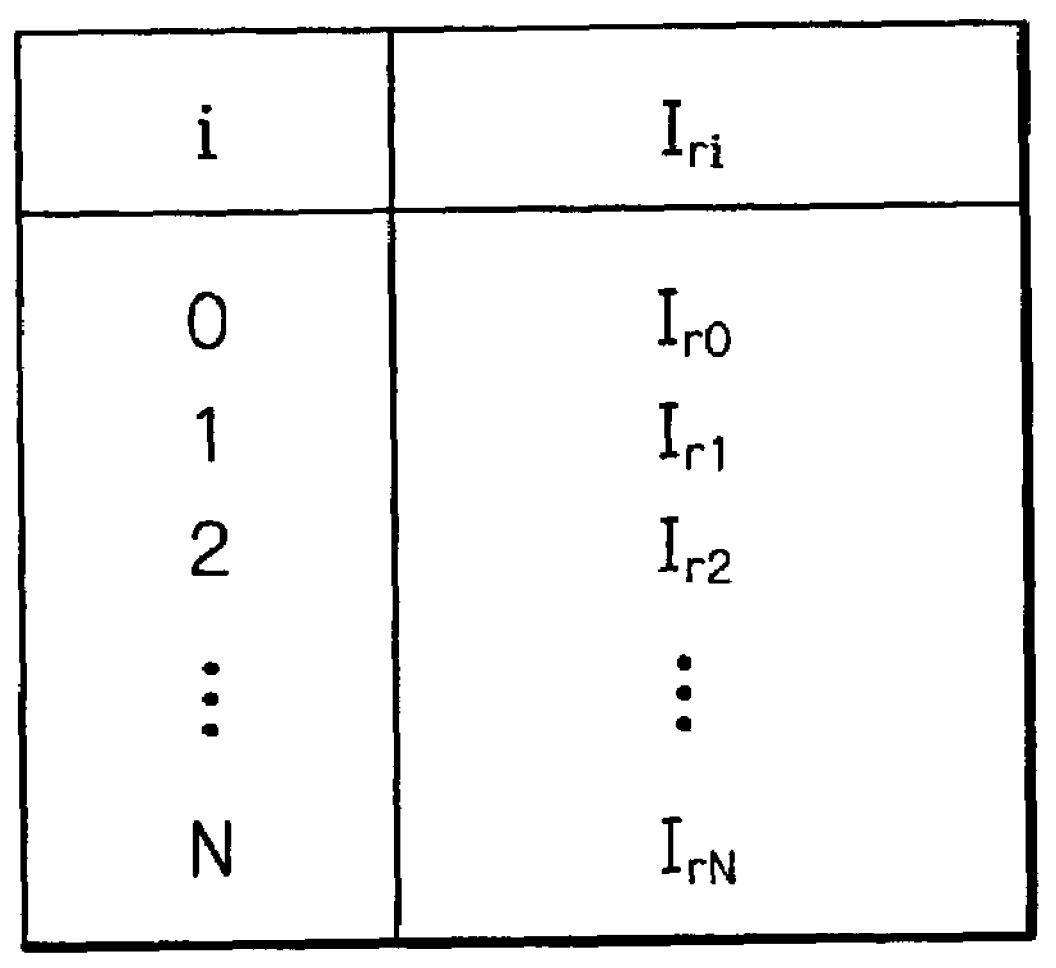

Note that the driving currents $I_{ri}$ (i=0 to N) corresponding to tilt angles $TA_0$, $TA_1$, . . . , $TA_6$ as shown in FIG. 2 where N=6 are predetermined and are stored in the memory as a table as shown in FIG. 5.

Next, at step 404, the input level $V_{in}$ and the output level $V_{out}$ are fetched from the loop level calculating unit 11 and a loop gain G is calculated by $$G_i \leftarrow V_{out}/V_{in}$$

Steps 405 and 406 repeat the control at steps 403 and 404 until the value i reaches N. As a result, a relationship between the value i (the driving current $I_{ri}$) and the loop gain $G_i$ is obtained as shown in FIG. 6.

Figure 6:
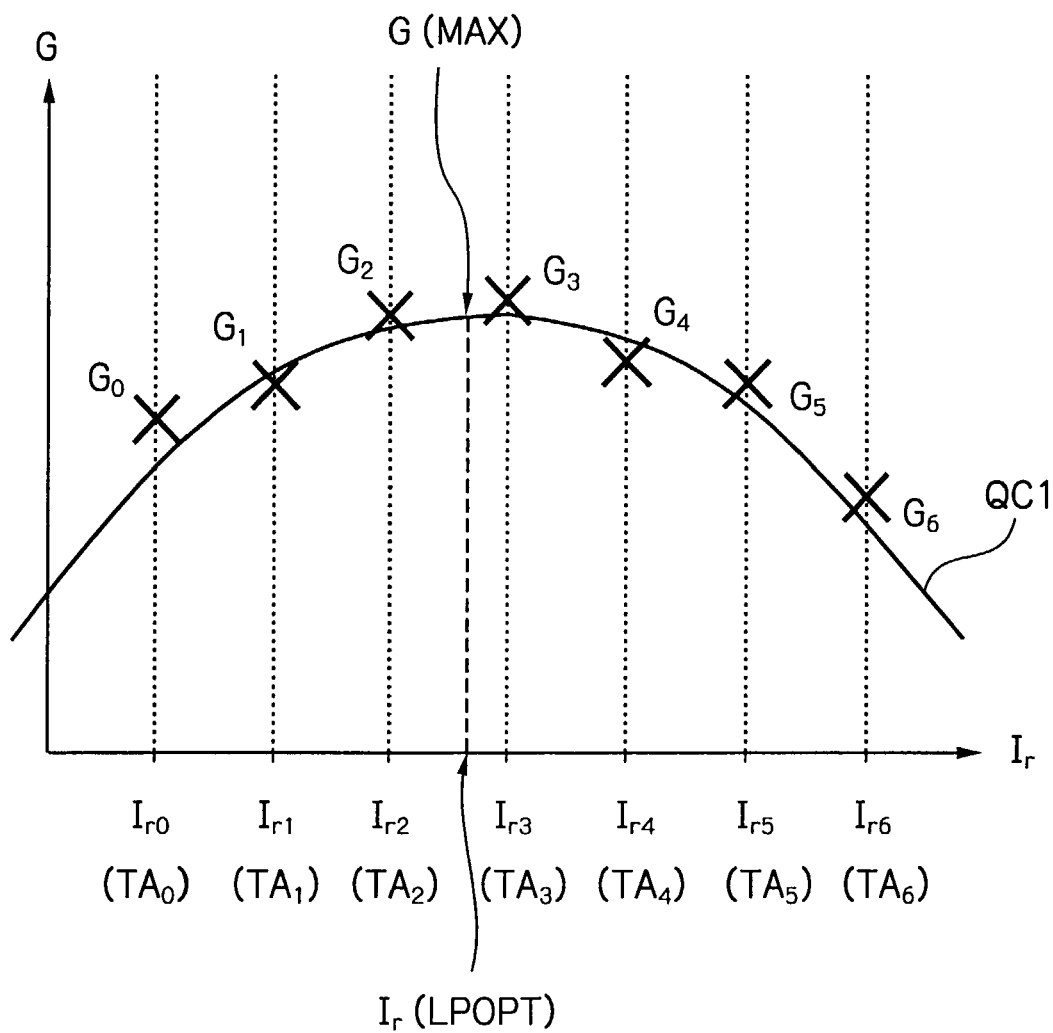
FIG. 6 is a diagram for explaining the flowchart of FIG. 4.

Next, at step 407, a curve such as a quadratic curve QC1 as shown in FIG. 6 is approximated by the least square method to the driving currents $I_{ri}$ and the loop gains $G_i$.

Next, at step 408, an optimal driving current $I_r$(LPOPT) having the maximal loop gain G(MAX) as shown in FIG. 6 is determined.

Next, at step 409, the driving current $I_r$ is fixed to $I_r$(LPOPT).

Next, at step 410, the sinusoidal wave generator 112 is turned OFF.

The routine of FIG. 4 is completed by step 411.

Figure 7:
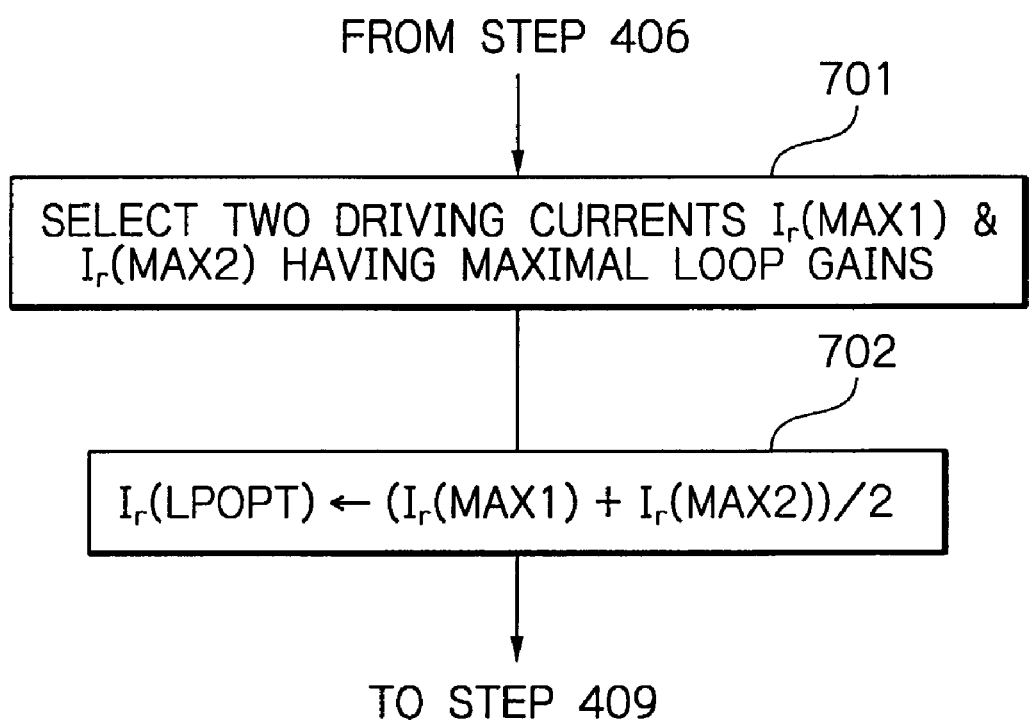
FIG. 7 is a flowchart showing a modification of the flowchart of FIG. 4.
Figure 8:
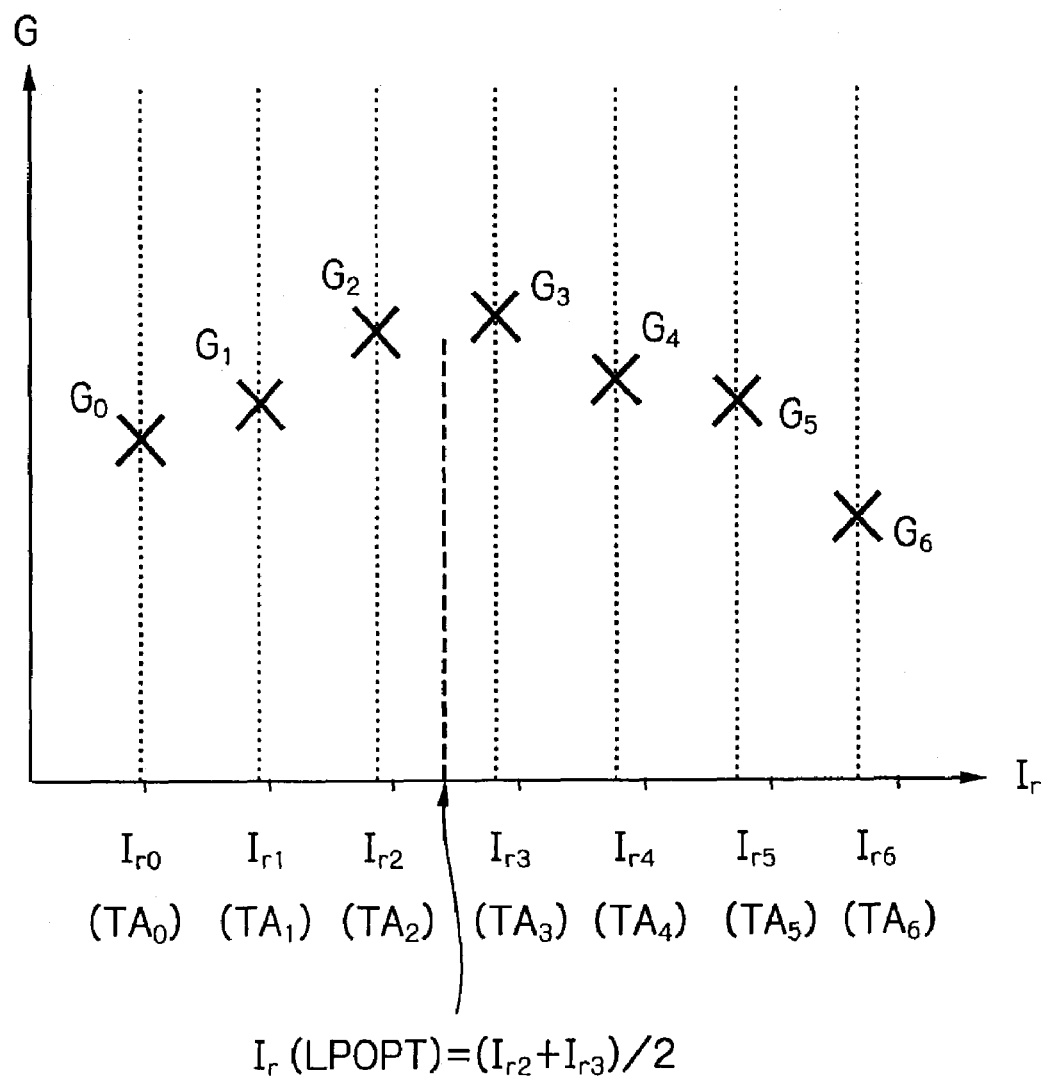
FIG. 8 is a diagram for explaining the flowchart of FIG. 7.

In FIG. 7, which is a modification of the flowchart of FIG. 4, steps 407 and 408 are replaced by steps 701 and 702, respectively. That is, the control at step 406 of FIG. 4 proceeds to step 701 where two driving currents $I_r$(MAX1) and $I_r$(MAX2) having maximal loop gains are selected. For example, $I_{r2}$ and $I_{r3}$ as shown in FIG. 8 are selected. Next, at step 702, an optimal driving current $I_r$(LPOPT) is calculated by $$I_r(LPOPT) \leftarrow (I_r(MAX1)+I_r(MAX2))/2$$

Then, the control proceeds to step 409 of FIG. 4.

In the modification as shown in FIG. 7, since the approximating step 407 of FIG. 4 is unnecessary, the speed of determination of the optimal driving current $I_r(LPOPT)$ is enhanced although the accuracy thereof deteriorates.

Figure 9:
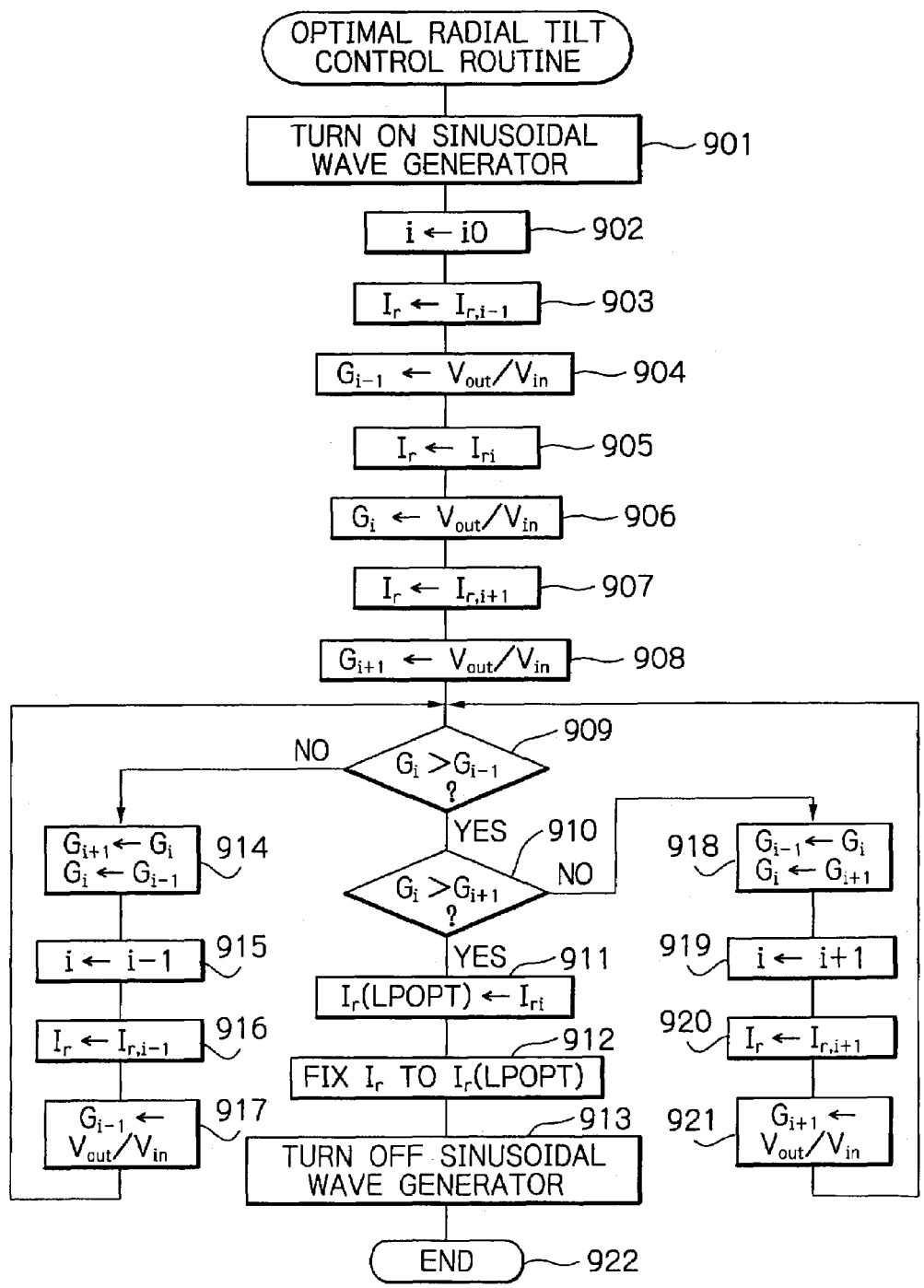
FIG. 9 is a flowchart for explaining a second operation of the system control unit of FIG. 1.

A second operation of the system control unit 12 of FIG. 4 will be explained next with reference to FIG. 9. In FIG. 9, an optimal driving current $I_r(LPOPT)$ is determined from three successive driving currents $I_{r,i-1}$, $I_r$ and $I_{r,i+1}$. The flowchart of FIG. 9 is also carried out every time the optical head 3 is placed in a new track of the optical disk 1.

First, at step 901, the sinusoidal wave generator 112 is turned ON.

Next, at step 902, a value i is initialized, i.e., i=i0. Note that the initial value i0 is not always 0, for example, N/2.

Next, at step 903, a driving current $I_r$ of the radial tilt control unit 15 is set by $$I_r \leftarrow I_{r,i-1}$$

Next, at step 904, the input level $V_{in}$ and the output level $V_{out}$ are fetched from the loop level calculating unit 11 and a loop gain $G_{i-1}$ is calculated by $$G_{i-1} \leftarrow V_{out}/V_{in}$$

Next, at step 905, a driving current $I_r$ of the radial tilt control unit 15 is set by $$I_r \leftarrow I_{ri}$$

Next, at step 906, the input level $V_{in}$ and the output level $V_{out}$ are fetched from the loop level calculating unit 11 and a loop gain $G_i$ is calculated by $$G_i \leftarrow V_{out}/V_{in}$$

Next, at step 907, a driving current $I_r$ of the radial tilt control unit 15 is set by $$I_r \leftarrow I_{r,i+1}$$

Next, at step 908, the input level $V_{in}$ and the output level $V_{out}$ are fetched from the loop level calculating unit 11 and a loop gain $G_{i+1}$ is calculated by $$G_{i+1} \leftarrow V_{out}/V_{in}$$

Next, at step 909, it is determined whether or not $G_i > G_{i-1}$ is satisfied, and at step 910, it is determined whether or not $G_i > G_{i+1}$ is satisfied. That is, steps 909 and 910 determines whether or not $G_i$ is the maximal value of $G_{i-1}$, $G_i$ and $G_{i+1}$. Only when $G_i > G_{i-1}$ and $G_i > G_{i+1}$, does the control proceed to step 911 which set an optimal driving current $I_r(LPOPT)$ by $$I_r(LPOPT) \leftarrow I_{ri}$$

Next, at step 912, the driving current $I_r$ is fixed to $I_r(LPOPT)$.

Next, at step 913, the sinusoidal wave generator 112 is turned OFF.

When it is determined at step 909 that $G_i \leq G_{i-1}$ is satisfied, the control proceeds to steps 914 to 917.

At step 914, the loop gains $G_i$ and $G_{i-1}$ are replaced by $G_{i+1}$ and $G_i$, respectively.

Next, at step 915, the value i is decremented by $$i \leftarrow i-1$$

Next, at step 916, a driving current $I_r$ of the radial tilt control unit 15 is set by $$I_r \leftarrow I_{r,i-1}$$

Next, at step 917, the input level $V_{in}$ and the output level $V_{out}$ are fetched from the loop level calculating unit 11 and a loop gain $G_{i-1}$ is calculated by $$G_{i-1} \leftarrow V_{out}/V_{in}$$

Then, the control returns to steps 909 and 910, thus determining whether or not $G_i$ is the maximal value of $G_{i-1}$, $G_i$ and $G_{i+1}$.

When it is determined at step 910 that $G_i \leq G_{i-1}$ is satisfied, the control proceeds to steps 918 to 921.

At step 918, the loop gains $G_i$ and $G_{i+1}$ are replaced by $G_{i-1}$ and $G_i$, respectively.

Next, at step 919, the value i is incremented by $$i \leftarrow i+1$$

Next, at step 920, a driving current $I_r$ of the radial tilt control unit 15 is set by $$I_r \leftarrow I_{r,i+1}$$

Next, at step 921, the input level $V_{in}$ and the output level $V_{out}$ are fetched from the loop level calculating unit 11 and a loop gain $G_{i+1}$ is calculated by $$G_{i+1} \leftarrow V_{out}/V_{in}$$

Then, the control returns to steps 909 and 910, thus determining whether or not $G_{i-1}$ is the maximal value of $G_{i-1}$, $G_i$ and $G_{i+1}$.

Even in FIG. 9, since the approximating step 407 of FIG. 4 is unnecessary, the speed of determination of the optimal driving current $I_r(LPOPT)$ is enhanced although the accuracy thereof deteriorates.

In the first embodiment as illustrated in FIG. 1, every time the optical head 3 is placed on one new of the optical disk, an optical driving current $I_r(LPOPT)$ is determined in accordance with the tracking loop gain to compensate for the radial tilt.

Figure 10:
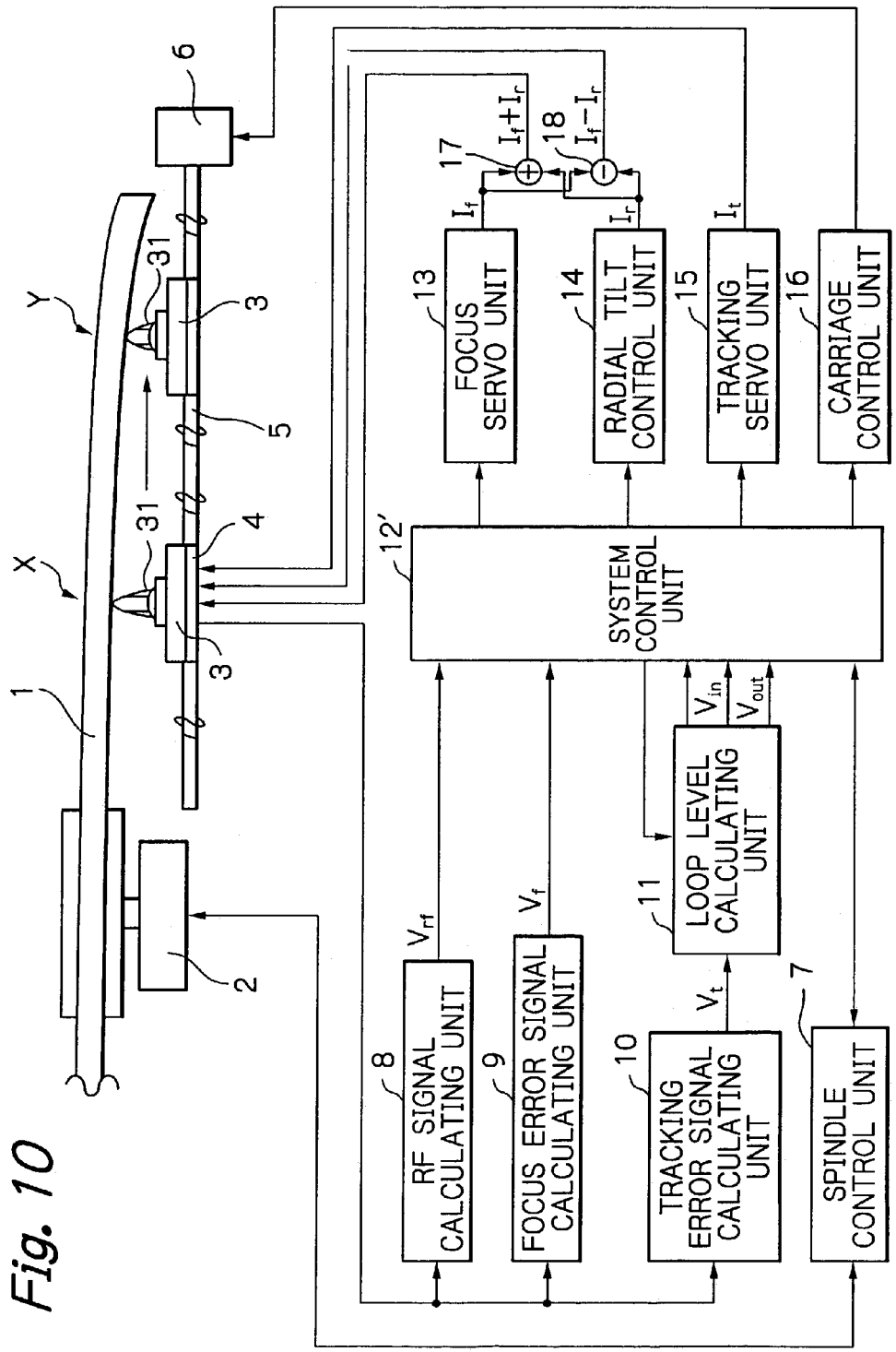
FIG. 10 is a diagram illustrating a second embodiment of the optical disk apparatus according to the present invention.
Figure 12:
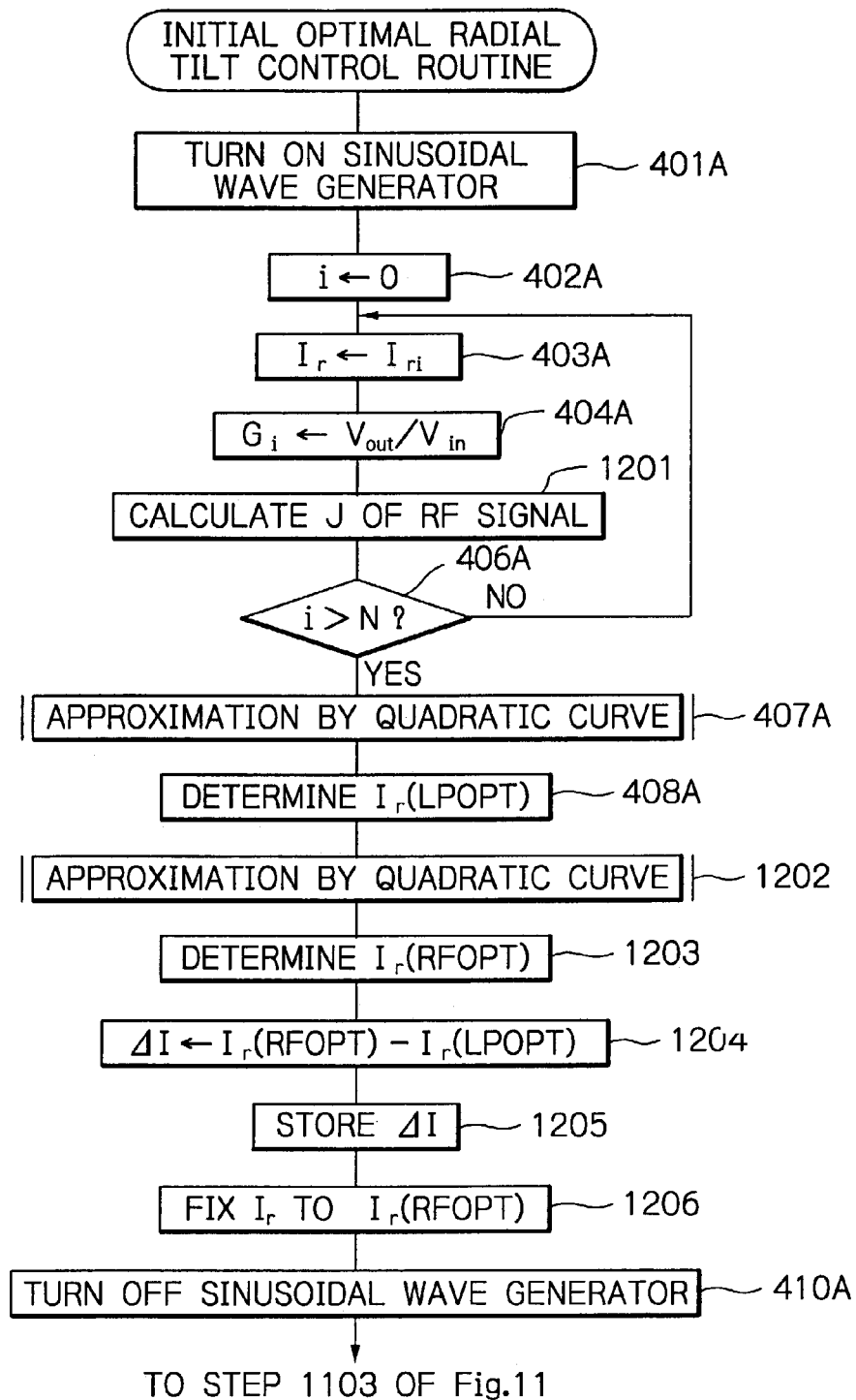
FIG. 12 is a detailed flowchart of step 1102 of FIG. 11.
Figure 15:
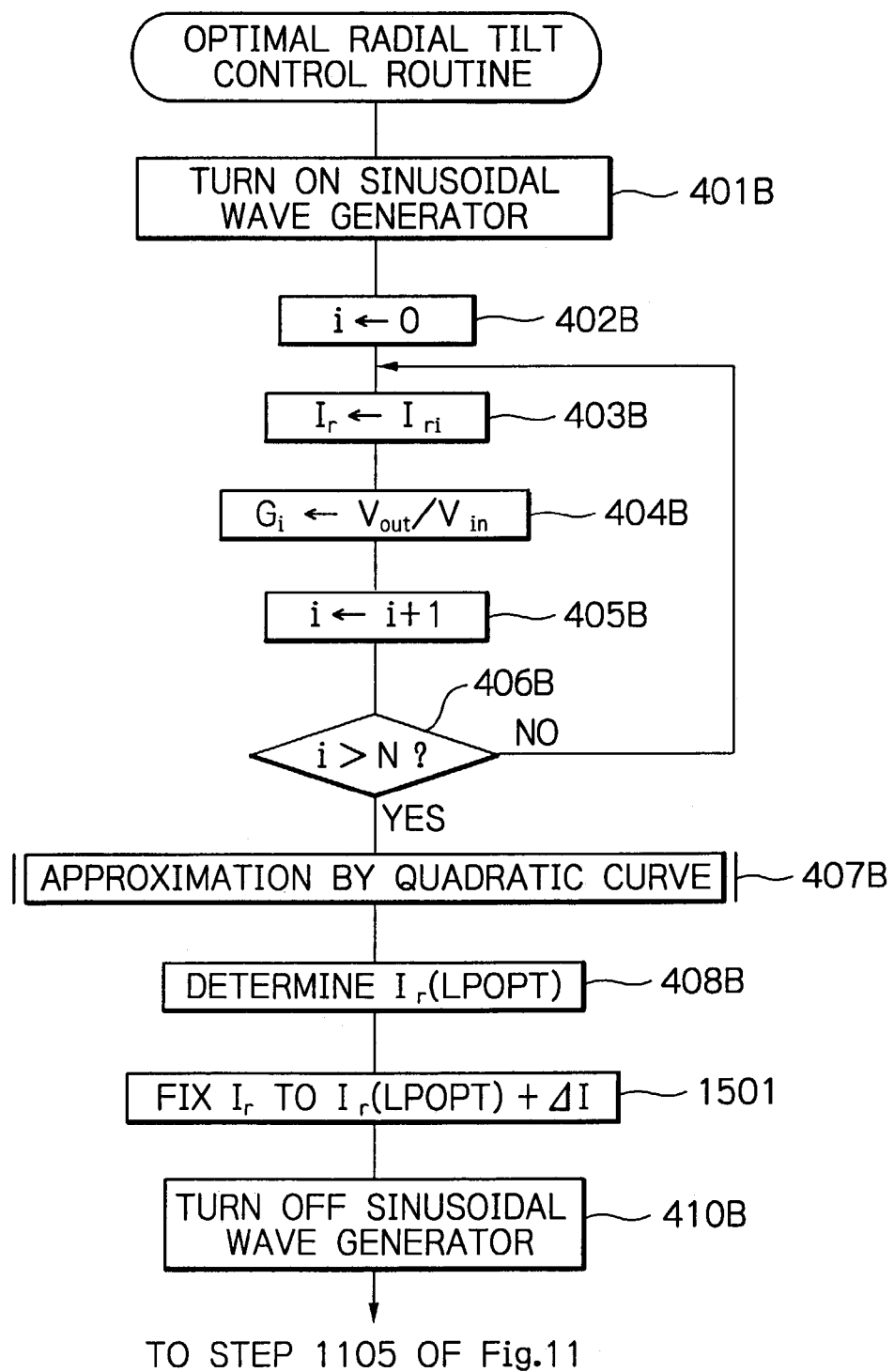
FIG. 15 is a detailed flowchart of step 1104 of FIG. 11.

In FIG. 10, which illustrates a second embodiment of the optical disk apparatus according to the present invention, when the optical head 3 is located in an initial track X of the optical disk 1, an initial optimal radial tilt control operation as shown in FIG. 12 is carried out, and after that, when the optical head 3 is located in an arbitrary track Y of the optical disk 3, a radial tilt control operation as shown in FIG. 15 is carried out.

Figure 11:
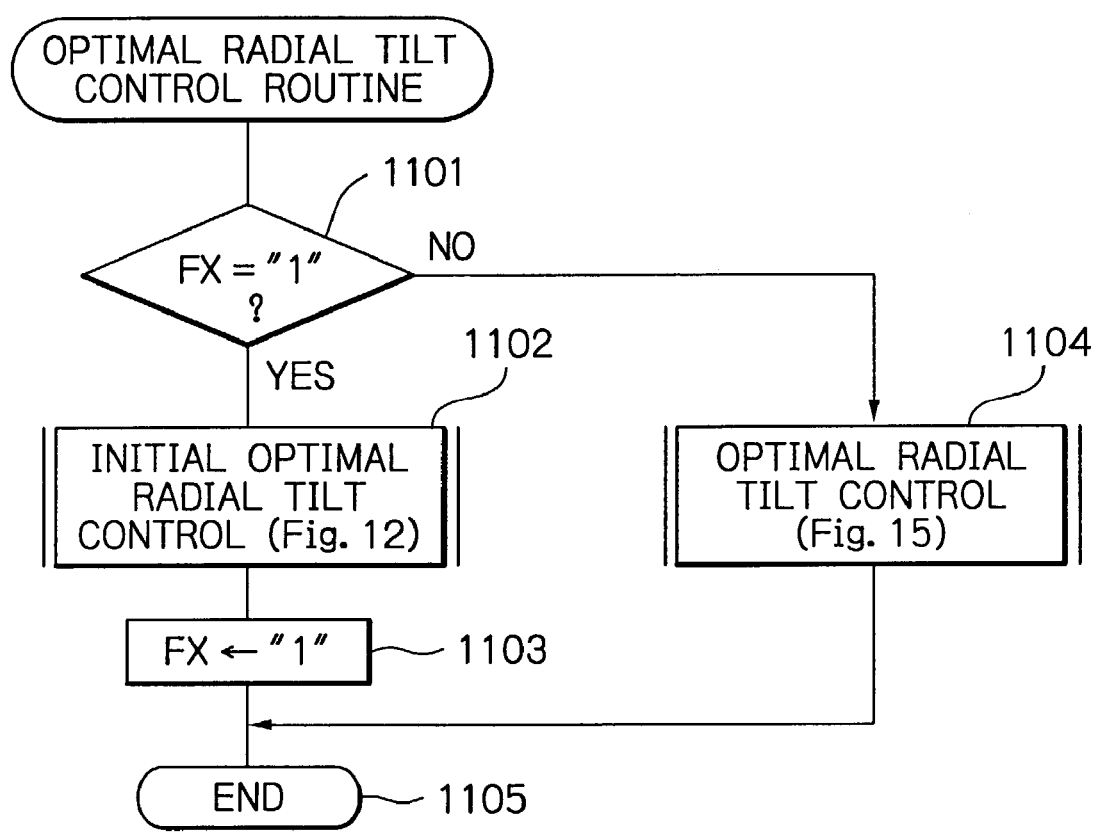
FIG. 11 is a flowchart for explaining the operation of the system control unit of FIG. 10.

That is, every time the optical head 3 is placed in a new track of the optical disk 1, a system control unit 12' carries out a flowchart as shown in FIG. 11.

In FIG. 11, first at step 1101, it is determined whether or not a flag FX is "0". Note that the flag FX is initially reset (FX="0") when the power is turned ON. If FX="0", the control proceeds to step 1102 which carries out the operation as shown in FIG. 12, and then, at step 1103, the flag FX is set (FX="1"). On the other hand, if FX="1", the control proceeds to step 1104 which carries out the operation as shown in FIG. 15. Then, the routine of FIG. 11 is completed by step 1105.

Thus, after the operation as shown in FIG. 12 for the initial track X is carried out, the operation as shown in FIG. 15 for the arbitrary track Y is carried out.

The initial optimal radial tilt control routine as shown in FIG. 12 will be explained below. Note that steps 401A through 408A and 410A are the same as steps 401 through 408 and 410, respectively, of FIG. 4, steps 1201 through 1205 are added to steps of FIG. 4, and step 409 is of FIG. 4 is modified to step 1206.

That is, at step 1201 the RF signal $V_{rf}$ is fetched from the RF signal calculating unit 8, and a jittering value $J_i$ of the RF signal $V_{rf}$ is calculated by a jittering detecting means (not shown). The jittering detecting means is constructed by a counter for counting a time difference between a regeneration clock signal and a regenerated data signal.

Figure 13:
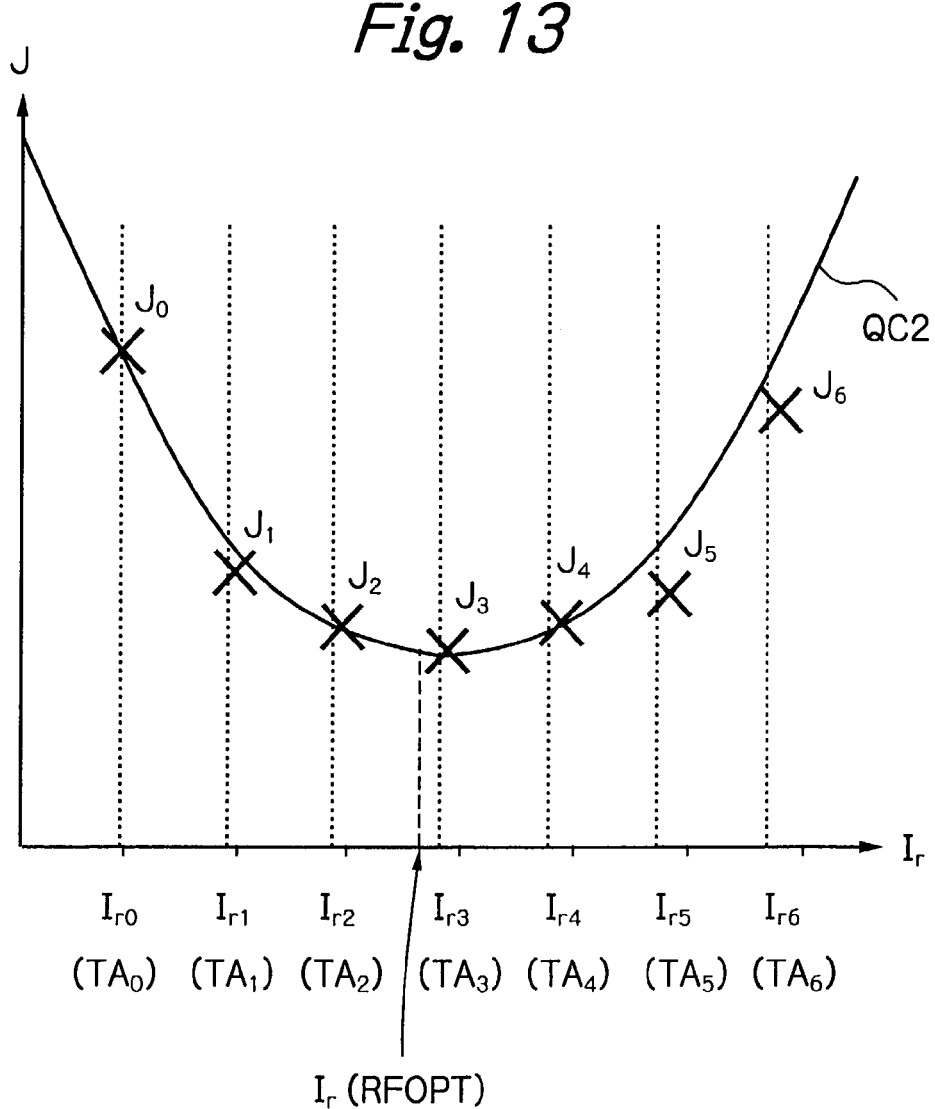
FIGS. 13 and 14 are diagrams for explaining the flowchart of FIG. 12.

After steps 405A and 406A repeat the control at step 1201, at step 1202, a curve such as a quadratic curve QC2 as shown in FIG. 13 is approximated by the least square method to the driving currents $I_{ri}$ and the jittering values $J_i$.

Next, at step 1203, an optimal driving current $I_r$(RFOPT) having the minimal jittering value J(MIN) as shown in FIG. 13 is determined.

Next, at step 1204, a correction value $\Delta I$ is calculated by $$\Delta I \leftarrow I_r(RFOPT) - I_r(LPOPT)$$

Next, at step 1205, the correction value $\Delta I$ is stored in the memory.

Next, at step 1206, the driving current $I_r$ is fixed to $I_r$(RFOPT).

Note that when the axis of the objective lens 31 is not optimum with respect to the optical disk 1, it is well known that the jittering value of the RF signal is increased. That is, when a radial tilt occurs, pit information recorded in a track adjacent to the track X leaks to invite a so-called crosstalk. Since this crosstalk depends on the pattern of the pit information, a jittering phenomenon in response to the radial tilt occurs.

Figure 14:
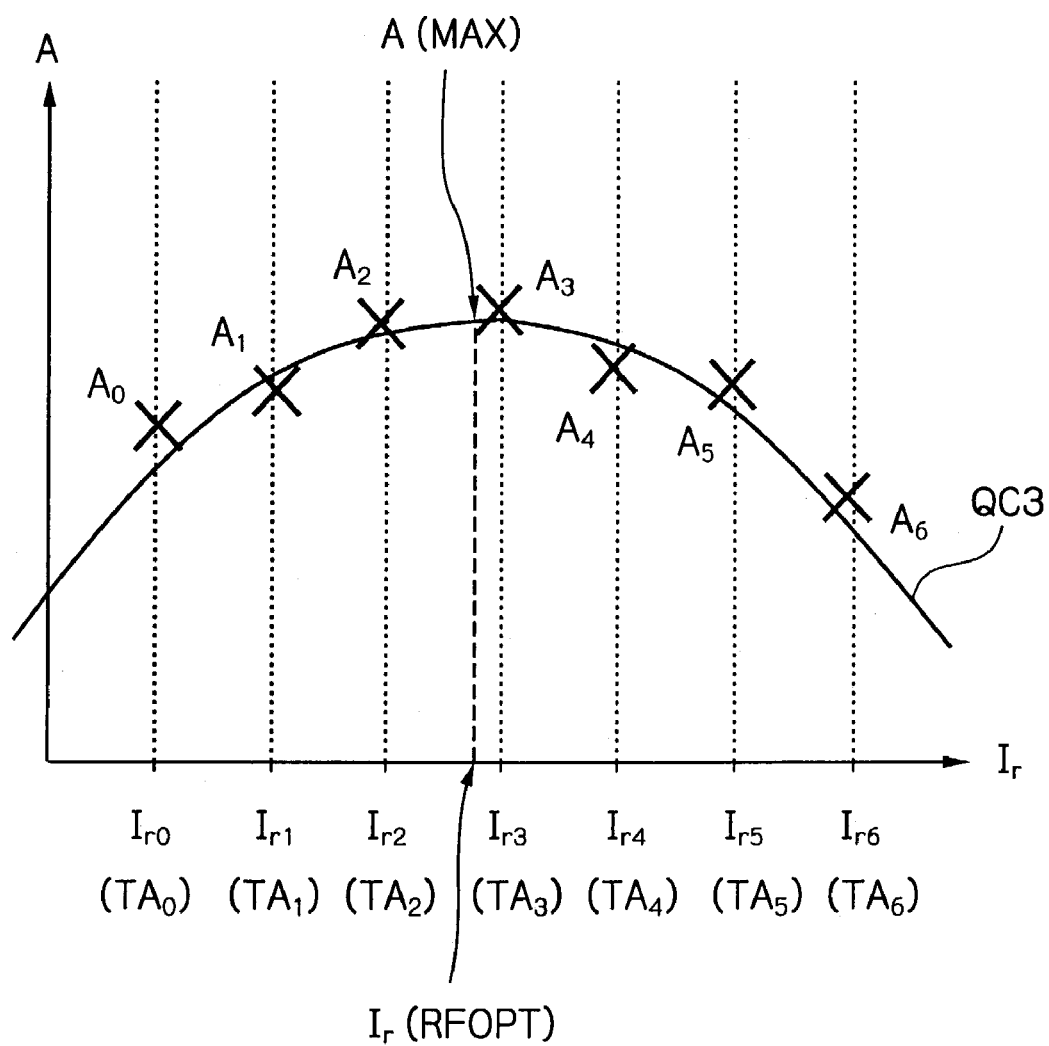

At steps 1201, 1202 and 1203 of FIG. 11, the amplitude A of the RF signal can be used instead of the jittering value J. In this case, at step 1201, the RF signal $V_{rf}$ is fetched from the RF signal calculating unit 8, and an amplitude of the RF signal $V_{rf}$ is calculated. Also, at step 1202, a curve such as a quadratic curve QC3 as shown in FIG. 14 is approximated by the least square method to the driving current $I_{ri}$ and the amplitude $A_i$. Further, at step 1203, an optimal driving current $I_r$(RFOPT) having the maximal amplitude A(MAX) as shown in FIG. 14 is determined.

The optimal radial tilt control routine as shown in FIG. 15 will be explained below. Note that steps 401B through 408B and 410B are the same as steps 401 through 408 and 410, respectively, and step 409 is modified to step 1501.

That is, at step 1501 the driving current $I_r$ is fixed to $I_r$(LPOPT)+$\Delta I$.

Thus, in the second embodiment as illustrated in FIG. 10, an optimal driving current $I_r$(LPOPT)+$\Delta I$ is substantially determined in accordance with the jittering value or amplitude of the RF signal to compensate for the radial tilt.

Note that a similar control as shown in FIG. 7 can be applied to steps 407A and 407A and steps 1202 and 1203 of FIG. 12 and steps 407B and 408B of FIG. 15. Also, a similar control as shown in FIG. 9 can be applied to FIGS. 12 and 15.

Figure 16:
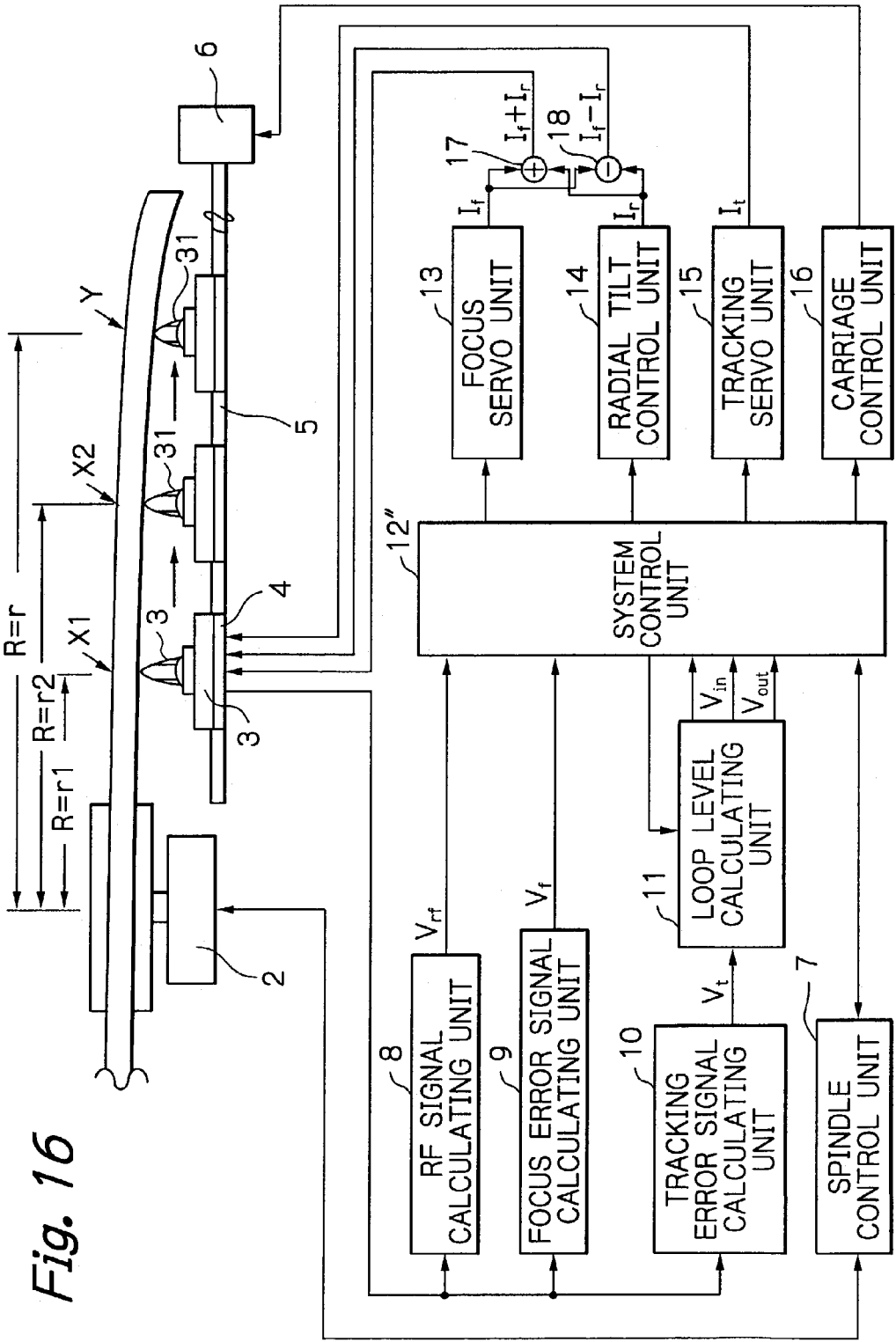
FIG. 16 is a diagram illustrating a third embodiment of the optical disk apparatus according to the present invention.

In FIG. 16, which illustrates a third embodiment of the optical disk apparatus according to the present invention, when the optical head 3 is located in initial tracks X1 and X2 of the optical disk 1, initial optimal radial tilt control operation as shown in FIG. 4 or 12 is carried out, and after that, when the optical head 3 is located in an arbitrary track Y of the optical disk 3, a radial tilt control operation using an interpolation method such as a linear interpolation, an interpolation method or an extrapolation method is carried out.

Figure 17:
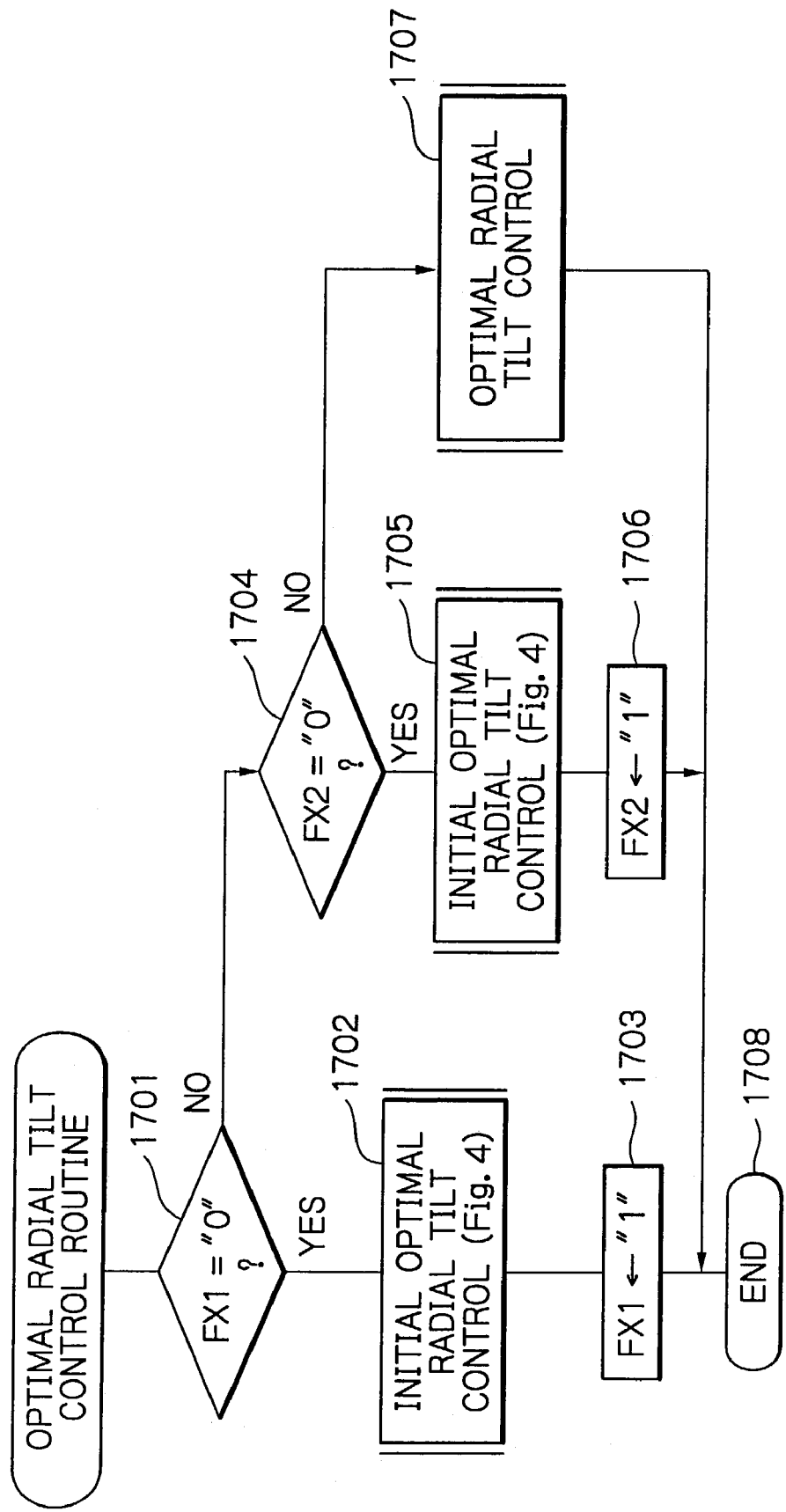
FIG. 17 is a flowchart for explaining the operation of the system control unit of FIG. 16.

That is, every time the optical head 3 is placed in a new track of the optical disk 1, a system control unit 12'' carries out a flowchart as shown in FIG. 17.

In FIG. 17, first, at step 1701, it is determined whether or not a flag FX1 is "0". Note that the flag FX1 is initially reset (FX1="0") when the power is turned ON. If FX1="0", the control proceeds to step 1702 which carries out the operation as shown in FIG. 4, so that an optimal driving current $I_r$(LPOPT) at R=r1 is calculated. Then, at step 1703, the flag FX1 is set (FX1="1").

When FX1="1", the control proceeds from step 1701 to 1704 which determines whether or not a flag FX2 ia "0". Note that the flag FX2 is also initially reset (FX2="0") when the power is turned ON. If FX2="0", the control proceeds to step 1705 which carries out the operation as shown in FIG. 4, so that an optimal driving current $I_r$(LPOPT) at R=r2 is calculated. Then at step 1706 the flag FX2 is set (FX2="1").

On the other hand, if FX1=FX2="1", the control proceeds via steps 1701 and 1704 to step 1707 which calculates an optimal driving current $I_r$(LPOPT) at R=r by an interpolation method. That is, if r1<r<r2, $$I_r(LPOPT) \text{ at } R = r \leftarrow$$
$$((I_r(LPOPT) \text{ at } R = r1)(r - r1) + I_r(LPOPT) \text{ at } R = r2)(r2 - r))/$$
$$(r2 - r1) \text{ Also, if } r1 < r2 < r, I_r(LPOPT) \text{ at } R =$$
$$r \leftarrow ((I_r(LPOPT) \text{ at } R = r2) - (I_r(LPOPT) \text{ at } R = r1)) \cdot$$
$$(r - r1)/(r2 - r1) \text{ Further,}$$
$$\text{if } r < r1 < r2, I_r(LPOPT) \text{ at } R = r \leftarrow ((I_r(LPOPT) \text{ at } R = r2) -$$
$$(I_r(LPOPT) \text{ at } R = r1)) \cdot (r - r2)/(r2 - r1)$$

The driving current $I_r$ is fixed to $I_r$(LPOPT) at R=r.

Then, the routine of FIG. 17 is completed by step 1708.

Thus, after the operation as shown in FIG. 4 for the initial tracks X1 and X2 is carried out, the operation at step 1707 for the arbitrary track Y is carried out.

In FIG. 17, the first embodiment as shown in FIG. 4 is applied; however, the second embodiment can be applied. In this case, at step 1702, an optimal driving current $I_r$(LPOPT) at R=r1 is calculated, and also, a correction value $\Delta I$ at R=r1 is calculated. Also, at step 1705, an optimal driving current $I_r$(LPOPT) at R=r2 is calculated, and also, a correction value $\Delta I$ at R=r2 is calculated. Further, at step 1707, an optimal driving current $I_r$(LPOPT) at R=r+I at R=r is calculated by an interpolation method. That is, if r1<r<r2, $$I_r(LPOPT) \text{ at } R = r + \Delta I \text{ at } R = r \leftarrow ((I_r(LPOPT) \text{ at } R = r1)(r - r1) +$$
$$(I_r(LPOPT) \text{ at } R = r2)(r2 - r))/(r2 - r1) +$$
$$(\Delta I \text{ at } R = r1)(r - r1) + (\Delta I \text{ at } R = r2)(r2 - r))/$$
$$(r2 - r1) \text{ Also, if } r1 < r2 < r1, I_r(LPOPT) \text{ at }$$
$$R = r \leftarrow ((I_r(LPOPT) \text{ at } R = r2) - (I_r(LPOPT) \text{ at } R = r1)) \cdot$$
$$(r - r1)/(r2 - r1) + (\Delta I \text{ at } R = r2) - (\Delta I \text{ at } R = r1)) \cdot$$
$$(r - r1)/(r2 - r1) \text{ Further, if } r < r1 < r2, I_r(LPOPT) \text{ at } R =$$
$$r \leftarrow ((I_r(LPOPT) \text{ at } R = r2) - (I_r(LPOPT) \text{ at } R = r1)) \cdot$$
$$(r - r2)/(r2 - r1) + ((\Delta I \text{ at } R = r2) - (\Delta I \text{ at } R = R1)) \cdot$$
$$(r - r2)/(r2 - r1)$$

The driving current $I_r$+$\Delta I$ is fixed to $I_r$(LPOPT) at R=r+$\Delta I$ at R=r.

In the third embodiment as illustrated in FIG. 16, only two initial tracks are provided; however, three or more initial tracks are provided.

Also, in the above-described embodiments, the compensation of a radial tilt is carried out by directly driving the objective lens 31; however, this compensation can be carried out without driving the objective lens 31. For example, a liquid crystal optical element is provided within the optical head 3, so that voltages are applied to the liquid crystal optical element. As a result, the radial tilt signal is brought close to zero. In this case, since the liquid crystal optical element is divided into a plurality of regions, the voltages applied to the regions change the coma aberration for the transmission light beam therethrough, so that the coma aberration due to the radial tilt of the optical disk 1 can be compensated for by the changed coma aberration. This liquid crystal optical element is disclosed in Sakashi Ohtake et al., "The Application of a Liquid Crystal Panel for the 15 Gbyte Optical Disk Systems", Jpn. J. Apple. Phys. Vol. 38, pp. 1744-1749, 1999.

As explained hereinabove, according to the present invention, a radial tilt can be accurately compensated for without a tilt sensor.

The invention claimed is:

1. An optical disk apparatus for focusing a light beam on a track of an optical disk by using a tracking control loop to perform at least one of recording and reproducing operations upon said optical disk, comprising:
   a loop level calculating unit for calculating loop levels of said tracking control loop; and
   a control unit, connected to said loop level calculating unit, for calculating a loop gain of said tracking control loop in accordance with the loop levels of said tracking control loop and compensating for a coma aberration of said optical beam focused on said optical disk in accordance with said calculated loop gain of said tracking control loop,
   wherein said control unit controls for the radial tilt of said optical disk by driving a tilt angle of an objective lens along a radial direction of said optical disk so that the loop gain of said tracking control loop is brought to a maximum value.

2. The optical disk apparatus as set forth in claim 1, wherein said loop level calculating unit comprises:
   a periodic wave generator for generating a periodic wave signal;
   an adder, connected to said periodic wave generator and said tracking control loop, for inserting said periodic wave signal into said tracking control loop;
   a first detection unit, connected to an output of said adder, for detecting an input level of said periodic wave signal to said tracking control loop; and
   a second detection unit, connected to an input of said adder, for detecting an output level of said periodic wave signal from said tracking control loop.

3. The optical disk apparatus as set forth in claim 2, wherein each of said first and second detection units comprises:
   a bandpass filter for passing a frequency component corresponding to said periodic wave signal therethrough;
   a full-wave rectifier connected to said bandpass filter; and
   a lowpass filter connected to said full-wave rectifier.

4. The optical disk apparatus as set forth in claim 1, wherein said control unit controls the radial tilt of said optical disk by generating an optimal correction amount relating to the radial tilt of said optical disk,
   said control unit approximating a relationship between a correction amount relating to the radial tilt of said optical disk and the loop gain of said tracking control loop to a curve and generating as said optimal correction amount a value of said correction amount corresponding to a maximum value of the loop gain of said tracking control loop on said curve.

5. The optical disk apparatus as set forth in claim 1, wherein said control unit controls the radial tilt of said optical disk by generating an optimal correction amount relating to the radial tilt of said optical disk,
   said control unit obtaining a relationship between a correction amount relating to the radial tilt of said optical disk and the loop gain of said tracking control loop, selecting two values of said correction amount having maximal values of the loop gain of said tracking control loop, and generating as said optimal correction amount a center value of the two values of said correction amount.

6. The optical disk apparatus as set forth in claim 1, wherein said control unit controls the radial tilt of said optical disk by generating an optimal correction amount relating to the radial tilt of said optical disk,
   said control unit obtaining successive first, second and third values of a correction amount relating to the radial tilt of said optical disk and first, second and third values of the loop gain of said tracking control loop corresponding to said successive first, second and third values of said correction amount, generating as said optimal correction amount said second value of said correction amount when said second value of the loop gain of said tracking control loop is larger than said first and third values of the loop gain of said tracking control loop, and renewing said successive first, second and third values of said correction amount when said second value of the loop gain of said tracking control loop is not larger than said first and third values of the loop gain of said tracking control loop.

7. The optical disk apparatus as set forth in claim 1, wherein said control unit controls the coma aberration of said optical beam by generating an optimal correction amount relating to the coma aberration of said optical beam,
   said control unit approximating a relationship between a correction amount relating to the coma aberration of said optical beam and the loop gain of said tracking control loop to a curve and generating as said optimal correction amount a value of said correction amount corresponding to a maximum value of the loop gain of said tracking control loop on said curve.

8. The optical disk apparatus as set forth in claim 1, wherein said control unit controls the coma aberration of said optical beam by generating an optimal correction amount relating to the coma aberration of said optical beam,
   said control unit obtaining a relationship between a correction amount relating to the coma aberration of said optical beam and the loop gain of said tracking control loop, selecting two values of said correction amount having maximal values of the loop gain of said tracking control loop, and generating as said optimal correction amount a center value of the two values of said correction amount.

9. The optical disk apparatus as set forth in claim 1, wherein said control unit controls the coma aberration of said optical beam by generating an optimal correction amount relating to the coma aberration of said optical beam,
   said control unit obtaining successive first, second and third values of a correction amount relating to the coma aberration of said optical disk and first, second and third values of the loop gain of said tracking control loop corresponding to said successive first, second and third values of said correction amount, generating as said optimal correction amount said second value of said correction amount when said second value of the loop gain of said tracking control loop is larger than said first and third values of the loop gain of said tracking control loop, and renewing said successive first, second and third values of said correction amount when said second value of the loop gain of said tracking control loop is not larger than said first and third values of the loop gain of said tracking control loop.

10. A method for controlling an optical disk apparatus for focusing a light beam on a track of an optical disk by using a tracking control loop to perform at least one of recording and reproducing operations upon said optical disk, comprising the steps of:
  calculating loop levels of said tracking control loop;
  calculating a loop gain of said tracking control loop in accordance with the loop levels of said tracking control loop; and
  compensating for a coma aberration of said optical beam focused on said optical disk in accordance with said calculated loop gain of said tracking control loop,
  wherein said compensating step controls the radial tilt of said optical disk by driving a tilt angle of an objective lens along a radial direction of said optical disk so that the loop gain of said tracking control loop is brought to a maximum value.

11. The optical disk apparatus as set forth in claim 10, wherein said loop level calculating step comprises the steps of:
  generating a periodic wave signal;
  inserting said periodic wave signal into said tracking control loop;
  detecting an input level of said periodic wave signal to said tracking control loop; and
  detecting an output level of said periodic wave signal from said tracking control loop.

12. The method as set forth in claim 10, wherein said compensating step controls the radial tilt of said optical disk by generating an optimal correction amount relating to the radial tilt of said optical disk,
  said compensating step further comprising the step of:
  approximating a relationship between a correction amount relating to the radial tilt of said optical disk and the loop gain of said tracking control loop to a curve; and
  generating as said optimal correction amount a value of said correction amount corresponding to a maximum value of the loop gain of said tracking control loop on said curve.

13. The method as set forth in claim 10, wherein said compensating step controls the radial tilt of said optical disk by generating an optimal correction amount relating to the radial tilt of said optical disk,
  said compensating step comprising the steps of:
  obtaining a relationship between a correction amount relating to the radial tilt of said optical disk and the loop gain of said tracking control loop;
  selecting two values of said correction amount having maximal values of the loop gain of said tracking control loop; and
  generating as said optimal correction amount a center value of the two values of said correction amount.

14. The method as set forth in claim 10, wherein said compensating step controls the radial tilt of said optical disk by generating an optimal correction amount relating to the radial tilt of said optical disk,
  said compensating step further comprising the steps of:
  obtaining successive first, second and third values of a correction amount relating to the radial tilt of said optical disk and first, second and third values of the loop gain of said tracking control loop corresponding to said successive first, second and third values of said correction amount;
  generating as said optimal correction amount said second value of said correction amount when said second value of the loop gain of said tracking control loop is larger than said first and third values of the loop gain of said tracking control loop; and
  renewing said successive first, second and third values of said correction amount when said second value of the loop gain of said tracking control loop is not larger than said first and third values of the loop gain of said tracking control loop.

15. The method as set forth in claim 10, wherein said compensating step controls the coma aberration of said optical beam by generating an optimal correction amount relating to the coma aberration of said optical beam,
  said compensating step further comprising the steps of:
  approximating a relationship between a correction amount relating to the coma aberration of said optical beam and the loop gain of said tracking control loop to a curve; and
  generating as said optimal correction amount a value of said correction amount corresponding to a maximum value of the loop gain of said tracking control loop on said curve.

16. The method as set forth in claim 10, wherein said compensating step controls the coma aberration of said optical beam by generating an optimal correction amount relating to the coma aberration of said optical beam,
  said compensating step further comprising the steps of:
  obtaining a relationship between a correction amount relating to the coma aberration of said optical beam and the loop gain of said tracking control loop;
  selecting two values of said correction amount having maximal values of the loop gain of said tracking control loop; and
  generating as said optimal correction amount a center value of the two values of said correction amount.

17. The method as set forth in claim 10, wherein said compensating step controls the coma aberration of said optical beam by generating an optimal correction amount relating to the coma aberration of said optical beam,
  said compensating step further comprising the steps of:
  obtaining successive first, second and third values of a correction amount relating to the coma aberration of said optical disk and first, second and third values of the loop gain of said tracking control loop corresponding to said successive first, second and third values of said correction amount;
  generating as said optimal correction amount said second value of said correction amount when said second value of the loop gain of said tracking control loop is larger than said first and third values of the loop gain of said tracking control loop; and
  renewing said successive first, second and third values of said correction amount when said second value of the loop gain of said tracking control loop is not larger than said first and third values of the loop gain of said tracking control loop.

* * * * *